(No Model.)

J. B. MUNSON.
BAKING AND ROASTING PAN.

No. 397,869. Patented Feb. 12, 1889.

Witnesses:
J. Stail.
Cho. H. Church.

Inventor:
John B. Munson
per Lemuel W. Serrell
Atty.

UNITED STATES PATENT OFFICE.

JOHN B. MUNSON, OF SCRANTON, PENNSYLVANIA.

BAKING AND ROASTING PAN.

SPECIFICATION forming part of Letters Patent No. 397,869, dated February 12, 1889.

Application filed May 25, 1888. Serial No. 275,088. (No model.)

*To all whom it may concern:*

Be it known that I, JOHN B. MUNSON, of Scranton, in the county of Lackawanna and State of Pennsylvania, have invented an Improvement in Baking and Roasting Pans; and the following is declared to be a description of the same.

My improved baking and roasting pan consists of two portions or two pans, the upper one of which is received within an L-shaped flange made upon the upper edge of the lower pan, and these two pans are connected together in a simple and efficient manner with a form of hinged joint and spring-catch, so that they can easily be removed from one another and placed together for use, and in my improvement the condensed vapors, especially in the operation of roasting, are free to pass down the inner sides of the upper pan and will fall back into the lower pan, the joint where the two pans come together being of such a shape that they are almost air-tight and no condensed vapor or water can escape.

Figure 1:
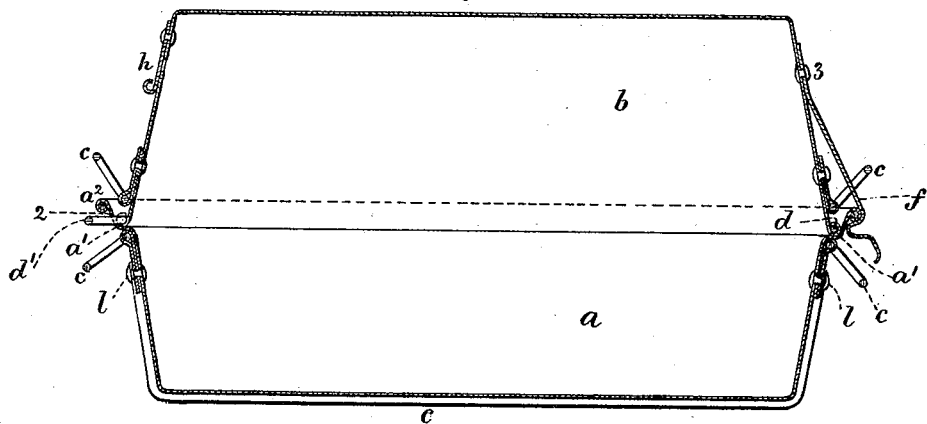
Figure 2:
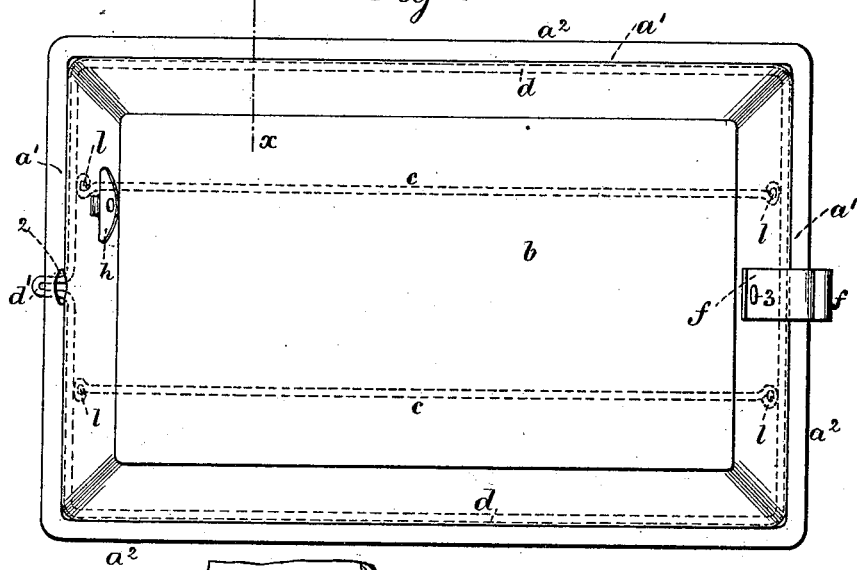

In the drawings, Figure 1 is a longitudinal section of my improved pan. Fig. 2 is a plan view of the same, and Fig. 3 is a section at $xx$, in larger size, of the meeting edges of the pan.

$a\ b$ represent the two portions or pans composing my improvement, the same being of about an equal size, and the lower pan, $a$, is made around its upper edge with an L-shaped flange, $a'$, and a wired turned-over edge at $a^2$, and across the bottom of the pan $a$ are the wires $c$, the ends of which wires have eyes and are secured by rivets $l$ to the end of the pan $a$, these wires serving to protect the bottom of the pan from wear and to raise the same above the bottom of the oven, so as to allow the air to circulate and prevent burning both of the pan and its contents.

Each of the portions or pans $a\ b$ is made with handles $c$, for grasping in carrying or handling the pans $a\ b$, and the pan $b$ has a rolled edge, $d$, and stiffening-wire, one portion of which is protruded from the rolled edge and bent outwardly to form a loop, $d'$, upon one end of the pan $b$, and this loop $d'$ is adapted to enter the opening at 2 in the L-flange $a'$ of the pan $a$, and to act as a hinge-joint between the respective pans when the same are being opened and shut, and to act together with the spring-catch $f$ in securing the pans $a\ b$ together, this spring-catch $f$ being secured at 3 on the pan $b$, and having a lower hook-shaped end to engage the outer rolled edge of the L-flange of the pan $a$; and I prefer to employ upon the upper pan, $b$, a swinging plate, $h$, that covers the air-vent. This air-vent has been previously employed in other pans, and when opened permits the escape of heated air and the products of roasting, and in the case of bread and meat facilitates the browning operation.

Figure 3:
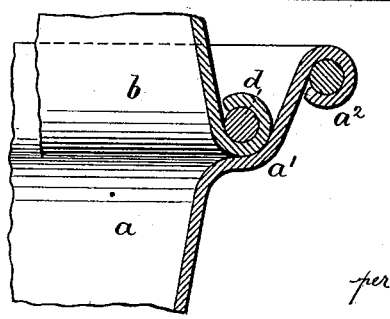

From Fig. 3 it will be seen how the rolled edge of the upper pan, $b$, fits into the L-flange $a'$ of the lower pan, $a$, forming a tight joint, a joint within the outer edge of the lower pan preventing the escape of condensation or the products of roasting and compelling the same to remain within the pan.

I claim as my invention—

The combination, in a baking and roasting pan, with the pan $b$, having a turned-over edge, $d$, of the pan $a$, having an L-shaped flanged edge, $a'$, and a turned-over edge at $a^2$, and provided with an opening at 2, the rigid wire loop $d'$, formed from the continuous stiffening-wire of the edge $d$, and a catch, $f$, substantially as specified.

Signed by me this 21st day of May, 1888.

JOHN B. MUNSON.

Witnesses:
F. E. LOOMIS,
A. D. DEAN.